US009264288B1

(12) United States Patent
Arora et al.

(10) Patent No.: US 9,264,288 B1
(45) Date of Patent: Feb. 16, 2016

(54) IDENTIFYING MEDIA NETWORK FLOWS THAT USE DYNAMIC CODEC IDENTIFICATIONS

(71) Applicants: Tarun Arora, Cupertino, CA (US); Lekha Shankar Nair, Santa Clara, CA (US)

(72) Inventors: Tarun Arora, Cupertino, CA (US); Lekha Shankar Nair, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 354 days.

(21) Appl. No.: 13/649,018

(22) Filed: Oct. 10, 2012

(51) Int. Cl.
*G06F 15/16* (2006.01)
*H04L 29/08* (2006.01)
*G06F 12/00* (2006.01)

(52) U.S. Cl.
CPC ................ *H04L 29/08072* (2013.01)

(58) Field of Classification Search
USPC ............ 709/203, 223–229, 245, 250
See application file for complete search history.

(56) References Cited

U.S. PATENT DOCUMENTS 5,822,537 A * 10/1998 Katseff et al. ............... 709/231
7,283,533 B1 * 10/2007 Kumar et al. ............ 370/395.52
2013/0254412 A1 * 9/2013 Menezes et al. ............. 709/228

OTHER PUBLICATIONS

Schulzrine et al., "RTP: A Transport Protocol for Real-Time Applications", Request for Comments(RFC): 3550, Jul. 2003, Network Working Group.*
Case et al., "A Simple Network Management Protocol (SNMP)", Request for Comments(RFC): 1157, May 1990, Network Working Group.*

* cited by examiner

*Primary Examiner* — Zarni Maung
(74) *Attorney, Agent, or Firm* — Hickman Palermo Becker Bingham LLP

(57) ABSTRACT

Techniques for identifying media network flows that use dynamic codec identifications are described. In an embodiment, network flow information for a network flow between a first endpoint and a second endpoint is received from a network device interposed between the first endpoint and the second endpoint, wherein the network flow information includes at least an address for the first endpoint and a particular payload identification number. A request is sent to the first endpoint for one or more characteristics belonging to the first endpoint. In response to receiving the one or more characteristics, a profile database is searched for an entry that maps the one or more characteristics to a profile, wherein the profile maps one or more payload identification numbers to one or more encoding types. An encoding type for content transferred over the network flow is determined based on the profile and the particular payload identification number.

24 Claims, 4 Drawing Sheets

IDENTIFYING MEDIA NETWORK FLOWS THAT USE DYNAMIC CODEC IDENTIFICATIONS

TECHNICAL FIELD

The present disclosure relates generally to processing media network flows that use dynamic codec identifications.

BACKGROUND

The Real-time Transport Protocol (RTP) defines a standardized packet format for delivering audio and video content over Internet Protocol (IP) networks. RTP is used to implement many different types of business applications such as digital telephony, video conferencing, and telepresence. Standards related to RTP can be found in the Internet Society's Request For Comment (RFC) 3550—"RTP: A Transport Protocol for Real-time Applications" and RFC 3551—"RTP Profile For Audio and Video Conferences and Minimal Control", the entire contents of which are hereby incorporated by reference for all purposes as though fully stated herein.

The packet header of an RTP packet contains a field which identifies the payload type of the media content being transported. In the context of RTP, the payload type defines the type of coder-decoder (codec) necessary to interpret the payload data. Examples of codecs include codecs compatible with encoding standards such as H.264, MPEG-4, etc. RTP supports a range of current multimedia formats and also allows new formats to be supported without revising the RTP standard.

The payload field only has a limited amount of space (7 bits), which can only represent at most 128 different codecs. Consequently RTP defines two distinct ranges for payload identifiers. The first range, referred to as the static range, covers payload identifiers 0-95. The static range is generally reserved for the most common types of encodings and remains constant regardless of the context in which RTP is used. The second range, referred to as the dynamic range, covers payload identifiers 96-127. Payload identifiers within the dynamic range are not mapped by default to any specific codec. Instead, the endpoints agree on a profile, which is a mapping between payload identifiers within the dynamic range and one or more codecs. Thus, when an endpoint receives a RTP packet with a payload identifier within the dynamic range, the endpoint maps the payload identifier to a codec using the profile. As a result, even though the standard for RTP may not define a payload identifier for a particular codec, the endpoints are still able to use the codec by defining their own dynamic mapping. For example, the foregoing approach enables endpoints to use codecs that did not exist at the time that RTP was defined.

The endpoints may use a separate protocol, such as Session Description Protocol (SDP), to facilitate transfer of the profile. The standard related to SDP can be found in RFC 4566—"SDP: Session Description Protocol", the entire contents of which is hereby incorporated by reference for all purposes as though fully stated herein.

One consequence of having dynamically mapped payload identifiers is that an intermediary networking device, logically located between the endpoints and configured to intercept or monitor traffic between endpoints but which has not participated in the negotiation of a profile that the endpoints previously performed, cannot determine the codecs used for an RTP session merely by examining the RTP header for the payload type. This creates a problem for certain network diagnostic tools that intercept and examine packets from RTP streams in order to provide visibility into the multimedia traffic in the network. Namely, these diagnostic tools are unable to determine the codecs used in a RTP session by passively monitoring RTP packets. Thus, such tools are unable to meaningfully interpret the payload data and fall short of predicting the traffic behaviors and bandwidth requirements imposed by the RTP media streams carried by the network.

SUMMARY OF THE INVENTION

The appended claims may serve as a summary of the invention.

DESCRIPTION OF EXAMPLE EMBODIMENTS

Figure 1:
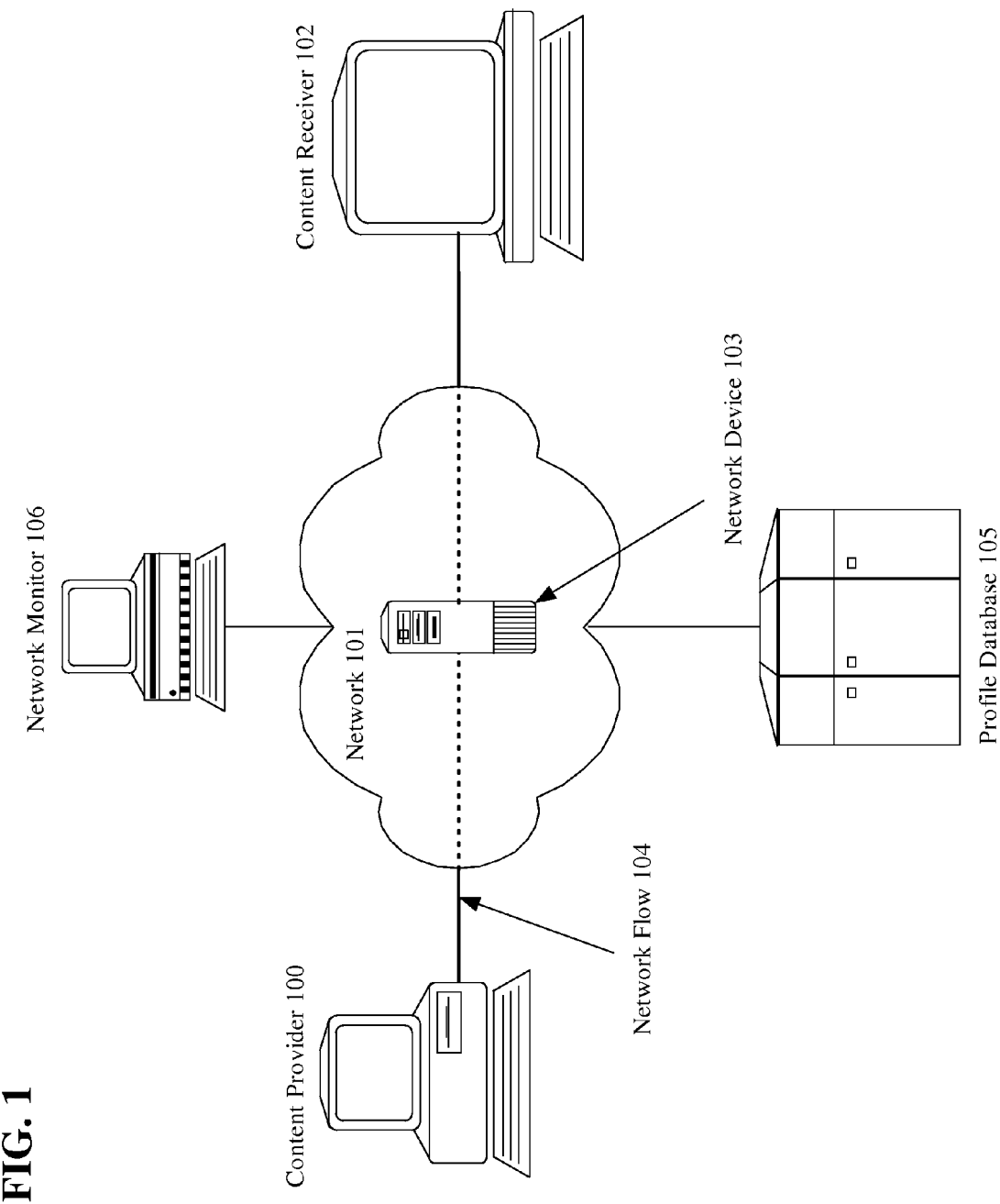
FIG. 1 illustrates an example computer-networking environment upon which an embodiment of the present invention may be implemented.

Techniques for identifying media network flows that use dynamic codec identifications are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Embodiments are described herein according to the following outline:

1.0 General Overview
2.0 Example Computer-Networking Environment
3.0 Example Network Device Process Flow
4.0 Example Network Monitor Process Flow
5.0 Network Flow Presentation
6.0 Hardware Overview

1.0 OVERVIEW

Techniques for identifying media network flows that use dynamic codec identifications are described. In an embodiment, network flow information for a network flow between a first endpoint and a second endpoint is received from a network device interposed between the first endpoint and the second endpoint, wherein the network flow information includes at least an address for the first endpoint and a particular payload identification number. A request is sent to the first endpoint for one or more characteristics belonging to the first endpoint. In response to receiving the one or more characteristics, a profile database is searched for an entry that maps the one or more characteristics to a profile, wherein the profile maps one or more payload identification numbers to one or more encoding types. An encoding type for content transferred over the network flow is determined based on the profile and the particular payload identification number.

In an embodiment, the processes described herein may be performed using an intermediary networking device that is logically located between endpoints and configured to intercept or monitor traffic between endpoints but which has not participated in the negotiation of a profile that the endpoints previously performed.

In an embodiment, the content is audio content, video content, or multimedia content.

In an embodiment, the network flow uses Real-time Transfer Protocol (RTP).

In an embodiment, the one or more characteristics identify one or more of software running on the first endpoint or a device type of the first endpoint.

In an embodiment, the request is a Simple Network Management Protocol (SNMP) request.

In an embodiment, the network flow uses a protocol adhering to a standard that does not provide a static mapping between the particular payload identification number and the encoding type.

In an embodiment, the network flow is presented in a web based graphical user interface page.

In other embodiments, the invention encompasses a computer apparatus and a computer-readable medium configured to carry out the foregoing steps.

2.0 EXAMPLE COMPUTER-NETWORKING ENVIRONMENT

FIG. 1 illustrates an example computer-networking environment with which an embodiment may be implemented. Each of the elements depicted within FIG. 1 are shown for clarity and may not be necessary to implement a particular embodiment. Furthermore, elements not shown in FIG. 1 may also be used to perform the functionalities described herein. In addition, functionalities described as performed by one element may also be performed by a different element. Although only a particular number of each element is depicted within FIG. 1, a practical environment may have many more, perhaps even hundreds or thousands, of each of the elements depicted within FIG. 1.

In FIG. 1, content provider 100 transfers media content to content receiver 102 over network flow 104. Messages passing over network flow 104 are transmitted across network 101, passing through network device 103 as a hop along the routing path between content provider 100 and content receiver 102. Network device 103 is configured to collect information related to network flow 104 and transmit the information to network monitor 106. Network monitor 106 is configured to process the information collected by network device 103 and contact one or both of the endpoints, content provider 100 and content provider 102, in order to request characteristics belonging to those endpoints. Upon receiving the characteristics, network monitor 106 determines the payload type of network flow 104 by searching profile database 105 for the profile that is associated with the received endpoint characteristics. Content provider 100, content receiver 102, network device 103, profile database 105, and network monitor 106 are communicatively coupled by network 101.

In an embodiment content provider 100 and content receiver 102 are computing devices, such as the example computing device described in more detail below in the "Hardware Overview" section. In another embodiment, content provider 100 and content provider 102 are specialized computing devices. For example, embodiments may use video infrastructure or audio infrastructure devices that are optimized for services such as video conferencing, digital telephony, and/or telepresence. In still other embodiments, content provider 100 and content receiver 102 represent network end stations such as laptop computers, server computers, mobile computers, tablet computers, smartphones and the like, or represent software components executing on their own respective computing devices. Although one element has been designated as a "content provider" and another element has been designated a "content receiver", those designations have been chosen arbitrarily for the purpose of illustrating clear examples. The techniques described herein may be practiced regardless of which element is transmitting and which element is receiving media content. For example, during video conferencing content provider 100 and content receiver 102 will often both transmit and receive content so that users at both ends may hear and/or view the other user.

In an embodiment, network 101 represents any combination of one or more local networks, wide area networks, internetworks, or service provider networks. Data exchanged over network 101, may be transferred using any number of network layer protocols, such as Internet Protocol (IP), Multiprotocol Label Switching (MPLS), Asynchronous Transfer Mode (ATM), and Frame Relay. Furthermore, in embodiments where network 101 represents a combination of multiple networks, different network layer protocols may be used at each of the underlying networks. In some embodiments, network 101 represents one or more interconnected internetworks such as the public Internet.

In an embodiment, network flow 104 represents an application layer connection or session used to transfer media content between content provider 100 and content receiver 102. For the purpose of illustrating clear examples, it will be assumed that the messages transferred over network flow 104 adhere to RTP. Further, it will be assumed that the codec of the media content being transferred is defined within the dynamic range of RTP and therefore content provider 100 and content receiver 102 have agreed beforehand on a profile mapping between a dynamic payload identifier and the codec used for the media content. In contrast, network device 103 and network monitor 106 have not participated in the profile mapping, negotiation or agreement between the content provider 100 and content receiver 102; therefore, at the time of receiving, monitoring or intercepting traffic between content provider 100 and content receiver 102, the network device 103 and network monitor 106 will be unaware of the codec associated with a particular RTP codec value that falls within the dynamic range.

The techniques described herein are not limited to RTP or even protocols that transfer media content. The techniques described herein may be applied to determine the payload format for any protocol that allows for dynamic mapping between payload identifiers and payload formats. For the purpose of explanation, a dynamic mapping occurs when the mapping between payload identifiers and payload formats are defined dynamically by the endpoints (or other participants), rather than statically defined by the protocol's standard.

Examples of media content that may be transferred over network flow 104 include audio content, video content, and/or multimedia content.

In an embodiment, network device 103 represents an internetworking infrastructure element such as a switch, router, or gateway responsible for forwarding packets through network 101. In another embodiment, network device 103 represents a proxy server. In still another embodiment, network device 103 represents a network device that has been configured to collect information related to network flows which pass through network 101. For example, network device 103 may represent a network device equipped with Enterprise Medianet technology, commercially available from Cisco Systems, Inc., San Jose, Calif.

In an embodiment, profile database 105 represents a database containing one or more profiles that map payload identifiers to codecs. In some embodiments, profile database 105 associates each profile with one or more characteristics. For example, each profile in profile database 105 may be associated with the hardware device type or software programs known to use the associated profile to map between payload identifiers and codecs. However, the exact characteristics associated with each profile are not critical to the techniques described herein.

Profile database 105 can be implemented using many different database formats. As one example, profile database 105 may be implemented as an object-oriented or relational database where each object instantiation or table row represents a different profile. As another example, profile database 105 may be implemented as an XML file.

In an embodiment, profile database 105 is implemented on a storage device kept at a remote location from network monitor 106 and communicatively coupled to network monitor 106 over network 101. In other embodiments, profile database 105 may be stored locally by network monitor 106. Furthermore, profile database 105 may be stored on any number of storage mediums, including, but not limited to, disk drives, flash drives, random access memory (RAM), optical drives, other storage devices, and combinations thereof.

In an embodiment, network monitor 106 represents a computing device executing a diagnostic tool application that monitors the network flows transmitting data across network 101. In one embodiment, network monitor 106 receives network flow information from network device 103 in response to network device 103 discovering a new network flow or detecting a change to a currently known network flow. In another embodiment, network monitor 106 receives network flow information from network device 103 at periodic intervals. In still other embodiments, network monitor 106 periodically polls network device 103 to request network flow information or polls network device 103 in response to user input. The information collected by network monitor 106 may be processed and visualized to assist network administrators in detecting problems and making decisions regarding the configuration of network 101. The features related to network monitor 106's presentation of network flows, including network flow 104, will be explained in more detail below in the "Network Flow Presentation" section. As one example, network monitor 106 may be executing Cisco's Collaboration Manager.

3.0 EXAMPLE NETWORK DEVICE PROCESS FLOW

Figure 2:
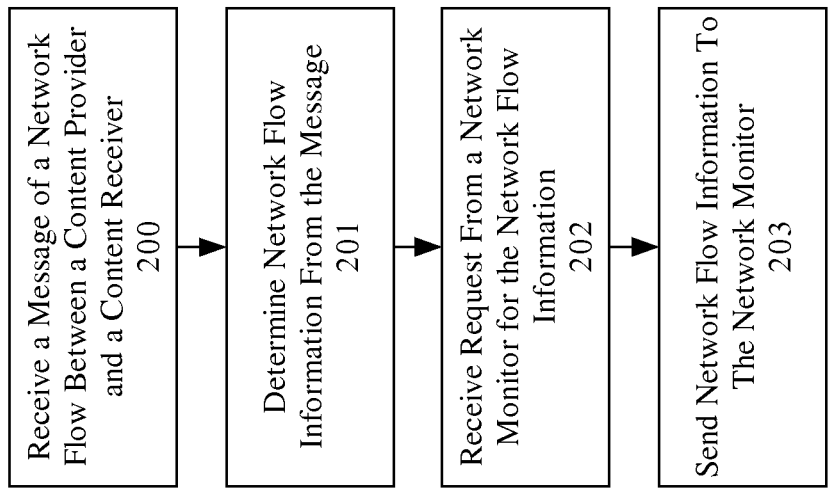
FIG. 2 illustrates an example process flow for a network device in block diagram form, according to an embodiment of the present invention.

FIG. 2 illustrates an example process flow for a network device in block diagram form. For the purpose of explanation, it will be assumed that the process flow depicted by FIG. 2 is implemented by network device 103.

At block 200, network device 103 receives a RTP header over the network flow 104 between content provider 100 and content receiver 102. Since network device 103 is a hop along the routing path between content provider 100 and content receiver 102 and thus the network device is interposed between the content provider and content receiver, network device 103 is able to inspect packets before forwarding the packets to the next hop within network 101. Thus, in an embodiment, network device 103 inspects one or more payloads of segments encapsulated within the packets to determine the RTP header.

At block 201, network device 103 determines network flow information from the RTP header received at block 200. In an embodiment, network device 103 obtains one or more features related to network flow 104 from the RTP header received at block 200 and the packets or segments which encapsulate the RTP header. For example, network device 103 may determine source and destination network address from the packet's network layer header, source and destination ports from the segment's transport layer header, and payload identifier from the RTP header. In addition, network device 103 may collect statistics related to the network flow 104, such as any of bandwidth usage, packet loss, jitter, and latency and include the statistics in the network flow information.

In some embodiments, network device 103 monitors network flows adhering to many different types of protocols, not just RTP. Thus, an embodiment may also include within the network flow information the protocol(s) to which network flow 104 adheres (network layer protocol, transport layer protocol, application layer protocol, etc.).

At block 202, network device 103 receives a request from network monitor 106 for the network flow information collected at block 201. In an embodiment, network device 103 receives a general request for information from network monitor 106. However, in other embodiments, network monitor 106 may request specific types of information. In still another embodiment, rather than receiving a request from network monitor 106 at block 202, network device 103 makes a determination to report the network flow information to network monitor 106. For example, network device 103 may determine to report out network flow information at periodic intervals, in response to detecting a new network flow, in response to determining a change in one or more features of a currently known network flow, or in response to user input.

At block 203, network device 103 sends the network flow information to network monitor 106. In an embodiment, network device 103 sends all the network flow information collected since the last request. In another embodiment, network device 103 sends only a subset of the collected network flow information.

4.0 EXAMPLE NETWORK MONITOR PROCESS FLOW

Figure 3:
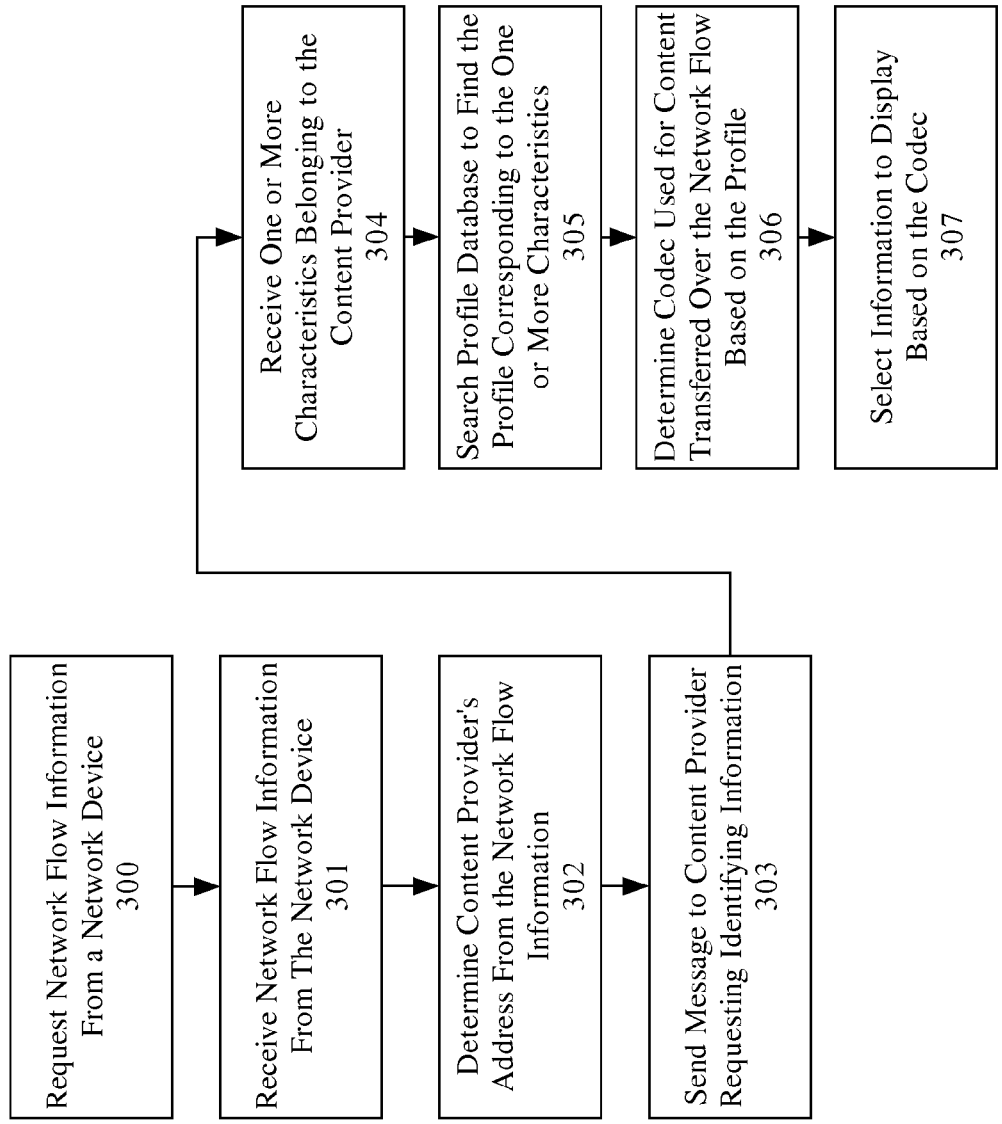
FIG. 3 illustrates an example process flow for a network monitor in block diagram form, according to an embodiment of the present invention.

FIG. 3 illustrates an example process flow for a network monitor in block diagram form. For the purpose of explanation, it will be assumed that the process flow depicted by FIG. 3 is implemented by network monitor 106.

At block 300, network monitor 106 requests network flow information from network device 103. In an embodiment, the request is a general request for all the network flow information collected by network device 103 since the last time network monitor 106 requested network flow information. In another embodiment, the request specifies information for particular flows and/or particular features. In still other embodiments, network device 103, instead of waiting from a request from network monitor 106, sends the network flow information without prompting. Consequently, such embodiments may skip block 300 and proceed directly to block 301.

At block 301, network monitor 106 receives network flow information from network device 103 for network flow 104. In an embodiment, network monitor 106 receives network flow information only for network flow 104. However, in other embodiments, network monitor 106 may receive information for more than one network flow in response to the request sent at block 300. Thus, network monitor 106 may repeat blocks 302-305 for each network flow for which information is received at block 301. In an embodiment, the network flow information received at block 301 contains at least a network address for one of the endpoints, content provider 100 or content receiver 102, and a payload identifier for the media being transmitted over network flow 104.

In an embodiment, network monitor 106 inspects the network flow information to determine whether network flow 104 uses RTP and/or whether the payload identifier for network flow 104 is within RTP's dynamic range. If network flow 104 does not use RTP, network monitor 106 skips blocks 302-305. If network flow 104 does not use a payload identifier within the dynamic range, network monitor 106 skips blocks 302-305 and instead looks up the corresponding codec in a table representing RTP's static mapping.

At block 302, network monitor 106 determines a network address for the content provider 100 from the network flow information received at block 301. In another embodiment, network monitor 106 instead determines the network address of content receiver 102 from the network flow information received at block 301. In still another embodiment, network monitor 106 determines network addresses for both content provider 100 and content receiver 102 from the network flow information received at block 301.

At block 303, network monitor 106 sends a request to content provider 100 for one or more characteristics belonging to content provider 100. In an embodiment, network monitor 106 uses the network address determined for content provider 100 at block 302 to send the request. However, in other embodiments, network monitor 106 may instead send the request to content receiver 102 or send the request to both content provider 100 and content receiver 102. However, which endpoint an embodiment chooses to retrieve the one or more characteristics from is not critical to the techniques described herein. As a result, when content provider 100 is referenced in the remainder of this section, other embodiments may substitute content receiver 102 or use both content provider 100 and content receiver 102.

In an embodiment, network monitor 106 sends a Simple Network Management Protocol (SNMP) request to content provider 100. SNMP is an internet-standard protocol for managing devices on IP networks. In particular, SNMP exposes management data in the form of variables on the managed systems, which describe the system configuration. These variables can then be queried (and sometimes set) by managing applications. Thus, in an embodiment, network monitor 106 sends a SNMP request to obtain values of one or more SNMP management information base (MIB) variables or objects for one or more characteristics describing the system configuration of content provider 100. For example, the requested characteristics may include the hardware device type, software program(s) executing on the device, and related version numbers.

At block 304, network monitor 106 receives the characteristics requested at block 303 from content provider 100.

At block 305, network monitor 106 searches profile database 105 to find the profile that corresponds to the one or more characteristics. In one embodiment, profile database 105 is communicatively coupled to a database server configured to accept and execute queries. Thus, network monitor 106 sends a message to the database server containing a query to select or obtain a result set of profiles matching or corresponding to the one or more characteristics.

In response, the database server scans profile database 105 and returns the corresponding profile. A response may comprise a dataset of rows or records for more than one matching profile; in such a case, network monitor 106 may use selection logic to select a particular profile of interest, such as a best matching profile. In another embodiment, network monitor 106 may store profile database 105 locally or have access to the raw data of profile database 105. Thus, in some embodiments, network monitor 106 instead scans profile database 105 for the profile corresponding to the one or more characteristics.

In an embodiment, once network monitor 106 determines that a matching profile exists for content provider 100, network monitor 106 informs network device 103 to record additional information for network flow 104. In another embodiment, once network monitor 106 determines that a matching profile exists for content provider 100, network monitor 106 requests additional information from content provider 100.

In some cases, profile database 105 may not contain a profile associated with the characteristics received at block 303. Thus, content provider 100 may be a type of endpoint that is not supported by network monitor 106. Consequently, network monitor 106 will not be able to determine the codec of the media transferred over network flow 104. Without being able to determine the codec, depending on the embodiment, network monitor 106 may not require network flow 104's information to be monitored at all or with as much detail. Thus, in some embodiments, network device 103's information collection is split into two stages, a discovery stage and an inventory stage.

During the discovery stage, network device 103 discovers network flow 104 and collects preliminary network flow information, such as the network addresses of the endpoints and the payload identifier. However, in order to save on overhead costs, network device 103 does not collect information related to one or more other features of network flow 104. For example, network device 103 may not collect statistics related to network flow 104 such as bandwidth usage, jitter, packet loss, or latency. Once polled by network monitor 106, network device 103 transfers the preliminary network flow information to network monitor 106. Network monitor 106 requests characteristics from one of the endpoints and queries profile database 105 to determine whether the endpoint is supported.

If a profile corresponding to the characteristics is located, then network monitor 106 determines that the endpoint is supported. As a result, network monitor 106 sends a message to network device 103 that informs network device 103 to begin collecting additional information related to network flow 104. In response, network device 103 enters the inventory stage and begins collecting additional information, such as the aforementioned statistics. In addition, network monitor 106 may send additional requests to the endpoint for additional characteristics to assist in the display of network flow 104. For example, the request at block 305 may ask for the endpoint's device type and currently executing software with the additional requests asking for the endpoint's name, available services, interfaces, and/or location.

If a profile corresponding to the characteristics is not located, then network monitor 106 determines that the endpoint is not supported. As a result, network monitor 106 may skip block 306 and/or 307 and leave network device 103 to only collect the reduced set of network flow information for network flow 104 and retrieve no further characteristics from the endpoints. However, in other embodiments, network monitor 106 may affirmatively send a message to network device 103 instructing network device 103 to ignore communications over network flow 104.

In other embodiments, network device 103 is pre-configured to collect and monitor the full set of network flow information for all available network flows. As a result, in such embodiments, network monitor 106 does not send a request to the network device 103 instructing the network device 103 to begin collecting additional data for the flows that are identified to be from supported endpoints. Instead, network device 103 is configured to send only a subset of the collected network flow information to the network monitor 106 by default. Thus, when the network monitor 106 determines that the endpoints are supported, the network monitor 106 requests the additional information from the network device 103.

At block 306, network monitor 106 determines the codec used for the media content being transferred over network flow 104 based on the profile found at block 305. In an embodiment, each profile contains a mapping between payload identifiers and codecs. Thus, network monitor 106 maps the payload identifier included in the network flow information received at block 301 to a corresponding codec using the profile found at block 305.

At block 307, network monitor 106 displays information to a user based on the codec. For example, network monitor 106 may display information such as codec type, compression/decompression speed, supported profiles, supported resolutions, rate control strategies, etc. In some embodiments, the network monitor 106 displays the information as part of the presentation of the network flow 104, as described in the "Network Flow Presentation" section below.

5.0 NETWORK FLOW PRESENTATION

In an embodiment, network monitor 106 presents an interface that visualizes the active network flows of network 101. In an embodiment, the interface is a web based graphical user interface (GUI). In an embodiment, network monitor 106 displays a graph representing the network topography of network 101. In response to user input selecting a node, network monitor 106 displays additional information for the selected node, such as the node's name, device type, software executing on the node, location, available services, network address, active flows in which the node participates, and network interfaces belonging to the node. In addition, a user may select a network interface to display the information pertaining specifically to that network interface. In an embodiment, network monitor 106 provides an option, which when selected by the user, causes network monitor 106 to request updated network flow information from the currently selected node or network interface. In an embodiment, the request is a SNMP request.

In an embodiment, each flow is identified by source network address, destination network address, source port, destination port, and one or more protocols to which communications over the network flow adheres. For example, the protocols may include network layer protocols, transport layer protocols, and application layer protocols. Furthermore, each flow may be presented with statistics, such as the network flow's packet loss, jitter, latency, and bandwidth usage.

In an embodiment, in response to receiving user input selecting a network flow, network monitor 106 highlights the path through network 101 that the network flow follows. In another embodiment, network monitor 106, in response to detecting that a network flow is experiencing more than a threshold value of packet loss, jitter, latency, or bandwidth usage displays an indication of where the problem is occurring. For example, the node or network interface detecting the network congestion may be displayed in a different color or otherwise displayed in a visually distinguished manner.

In some embodiments, nodes that are configured to monitor RTP network flows and determine codec types according to the techniques described herein are displayed with a unique icon. In one embodiment, network monitor 106 provides an option which when selected by the user filters the active network flows for such nodes so that only RTP network flows are displayed. In an embodiment, network monitor 106 displays RTP flows with the associated codec. In some embodiments, network monitor 106 also displays background information related to the codec type, including compression/decompression speed, supported profiles, supported resolutions, and rate control strategies. Thus, network monitor 106 may display an option that allows users to set quality of service parameters for network flows. In response, network manager 106 instructs the nodes of network 101 along the network flow's path to give greater or lesser priority to the network flow's data. In an embodiment, the threshold at which network monitor 106 indicates that a problem has occurred with a RTP network flow is based on the codec type. For example, codecs which require faster and more reliable service may trigger the indication at a lower threshold.

6.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
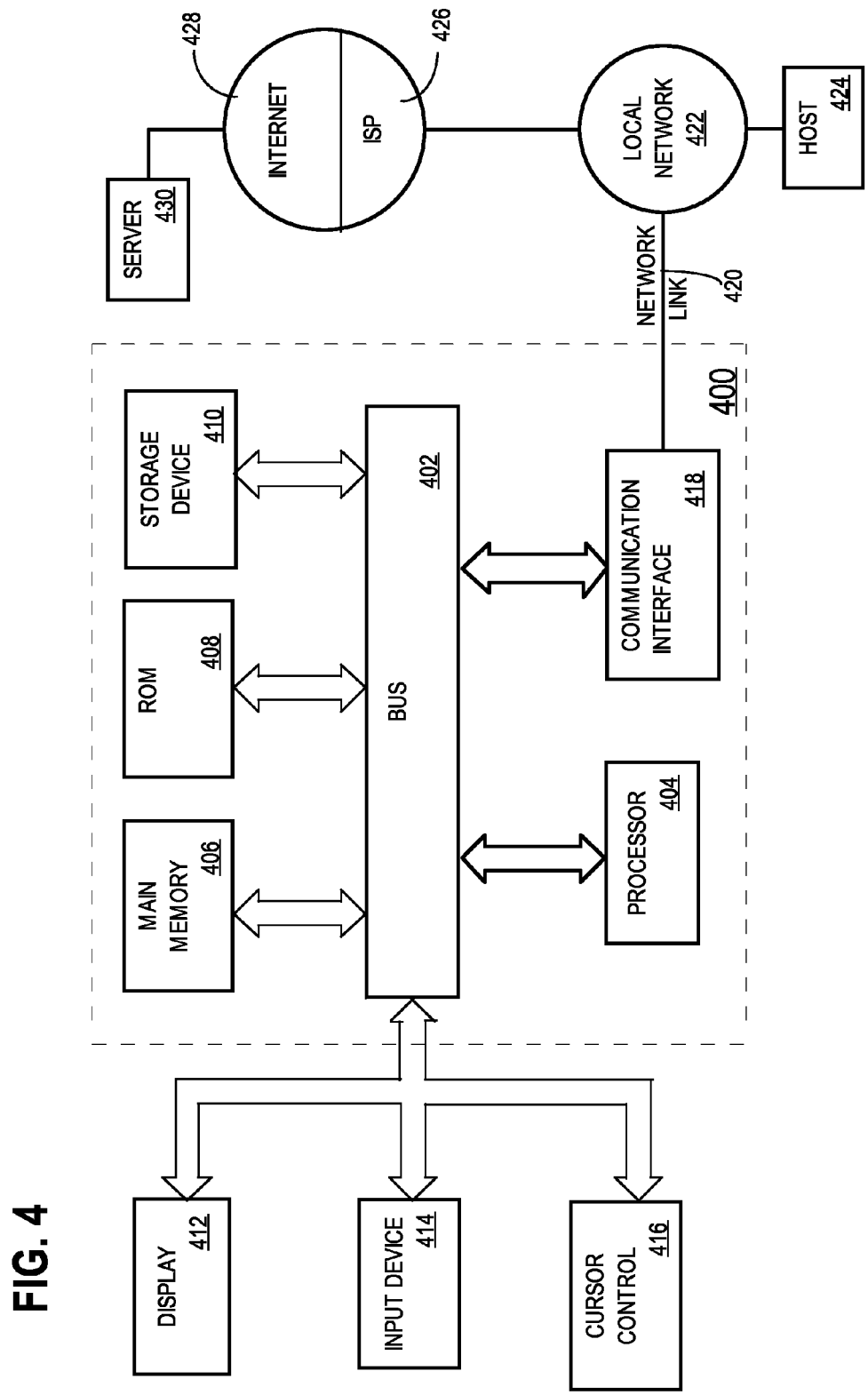
FIG. 4 is a block diagram that illustrates a computer system upon which an embodiment of the present invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

a network monitor computer receiving network flow information, for a network flow of digital media packets between a first endpoint and a second endpoint, from a network device interposed between the first endpoint and the second endpoint, wherein the network flow information includes at least an address for the first endpoint and a particular payload identification value;

the network monitor computer sending a request to the first endpoint to obtain one or more characteristics of the first endpoint;

in response to receiving the one or more characteristics, the network monitor computer searching a profile database for an entry that maps the one or more characteristics to a profile, wherein the profile maps one or more payload identification values to one or more content encoding types;

wherein the profile database contains a plurality of entries that each map a set of characteristics to a respective profile, the respective profile mapping a set of payload identification values to a set of content encoding types;

the network monitor computer determining an encoding type for content transferred over the network flow based on the profile and the particular payload identification value;

the network monitor computer presenting information to a user computer based on the encoding type;

wherein the method is performed by one or more computing devices.

2. The method of claim 1, wherein the content is audio content, video content, or multimedia content.

3. The method of claim 1, wherein the network flow uses Real-time Transfer Protocol.

4. The method of claim 1, wherein the one or more characteristics identify one or more of software running on the first endpoint or a device type of the first endpoint.

5. The method of claim 1, wherein the request is a Simple Network Management Protocol request.

6. The method of claim 1, wherein the network flow uses a protocol adhering to a standard that does not provide a static mapping between the particular payload identification value and the encoding type.

7. The method of claim 1, wherein the particular payload identification value is within a dynamic range of payload values defined in a content communication protocol associated with the network flow, and wherein the first endpoint and second endpoint have negotiated an agreement upon the profile before the receiving, sending, searching and determining.

8. The method of claim 1, wherein the network flow is a Real Time Protocol (RTP) flow and the particular payload identification value is within a dynamic range of RTP payload values, and wherein the first endpoint and second endpoint have negotiated a profile that associates the particular payload identification value with a particular codec before the receiving, sending, searching and determining.

9. A non-transitory computer readable medium storing one or more instructions which, when executed by one or more processors, cause the one or more processors to perform the steps of:

a network monitor computer receiving network flow information, for a network flow of digital media packets between a first endpoint and a second endpoint, from a network device interposed between the first endpoint and the second endpoint, wherein the network flow information includes at least an address for the first endpoint and a particular payload identification value;

the network monitor computer sending a request to the first endpoint to obtain one or more characteristics of the first endpoint;

in response to receiving the one or more characteristics, the network monitor computer searching a profile database for an entry that maps the one or more characteristics to a profile, wherein the profile maps one or more payload identification values to one or more content encoding types;

wherein the profile database contains a plurality of entries that each map a set of characteristics to a respective profile, the respective profile mapping a set of payload identification values to a set of content encoding types;

the network monitor computer determining an encoding type for content transferred over the network flow based on the profile and the particular payload identification value;

the network monitor computer presenting information to a user computer based on the encoding type.

10. The non-transitory computer readable medium of claim 9, wherein the content is audio content, video content, or multimedia content.

11. The non-transitory computer readable medium of claim 9, wherein the network flow uses Real-time Transfer Protocol.

12. The non-transitory computer readable medium of claim 9, wherein the one or more characteristics identify one or more of software running on the first endpoint or a device type of the first endpoint.

13. The non-transitory computer readable medium of claim 9, wherein the request is a Simple Network Management Protocol request.

14. The non-transitory computer readable medium of claim 9, wherein the network flow uses a protocol adhering to a standard that does not provide a static mapping between the particular payload identification value and the encoding type.

15. The non-transitory computer readable medium of claim 9, wherein the particular payload identification value is within a dynamic range of payload values defined in a content communication protocol associated with the network flow, and wherein the first endpoint and second endpoint have negotiated an agreement upon the profile before the receiving, sending, searching and determining.

16. The non-transitory computer readable medium of claim 9, wherein the network flow is a Real Time Protocol (RTP) flow and the particular payload identification value is within a dynamic range of RTP payload values, and wherein the first endpoint and second endpoint have negotiated a profile that associates the particular payload identification value with a particular codec before the receiving, sending, searching and determining.

17. An apparatus comprising:

one or more processors of a network monitor computer;

logic coupled to the one or more processors and configured to:

receive network flow information, for a network flow of digital media packets between a first endpoint and a second endpoint, from a network device interposed between the first endpoint and the second endpoint, wherein the network flow information includes at least an address for the first endpoint and a particular payload identification value;

send a request to the first endpoint to obtain one or more characteristics of the first endpoint;

in response to receiving the one or more characteristics, searching a profile database for an entry that maps the one or more characteristics to a profile, wherein the profile maps one or more payload identification values to one or more content encoding types;

wherein the profile database contains a plurality of entries that each map a set of characteristics to a respective profile, the respective profile mapping a set of payload identification values to a set of content encoding types;

determine an encoding type for content transferred over the network flow based on the profile and the particular payload identification value;

present information to a user computer based on the encoding type.

18. The apparatus of claim 17, wherein the content is audio content, video content, or multimedia content.

19. The apparatus of claim 17, wherein the network flow uses Real-time Transfer Protocol.

20. The apparatus of claim 17, wherein the one or more characteristics identify one or more of software running on the first endpoint or a device type of the first endpoint.

21. The apparatus of claim 17, wherein the request is a Simple Network Management Protocol request.

22. The apparatus of claim 17, wherein the network flow uses a protocol adhering to a standard that does not provide a static mapping between the particular payload identification value and the encoding type.

23. The apparatus of claim 17, wherein the particular payload identification value is within a dynamic range of payload values defined in a content communication protocol associated with the network flow, and wherein the first endpoint and second endpoint have negotiated an agreement upon the profile before the receiving, sending, searching and determining.

24. The apparatus of claim 17, wherein the network flow is a Real Time Protocol (RTP) flow and the particular payload identification value is within a dynamic range of RTP payload values, and wherein the first endpoint and second endpoint have negotiated a profile that associates the particular payload identification value with a particular codec before the receiving, sending, searching and determining.

\* \* \* \* \*